Jan. 20, 1948.  E. C. PATTEE  2,434,672
METHOD OF CONCENTRATING DISTILLERY STILL SLOP
Filed Oct. 15, 1943
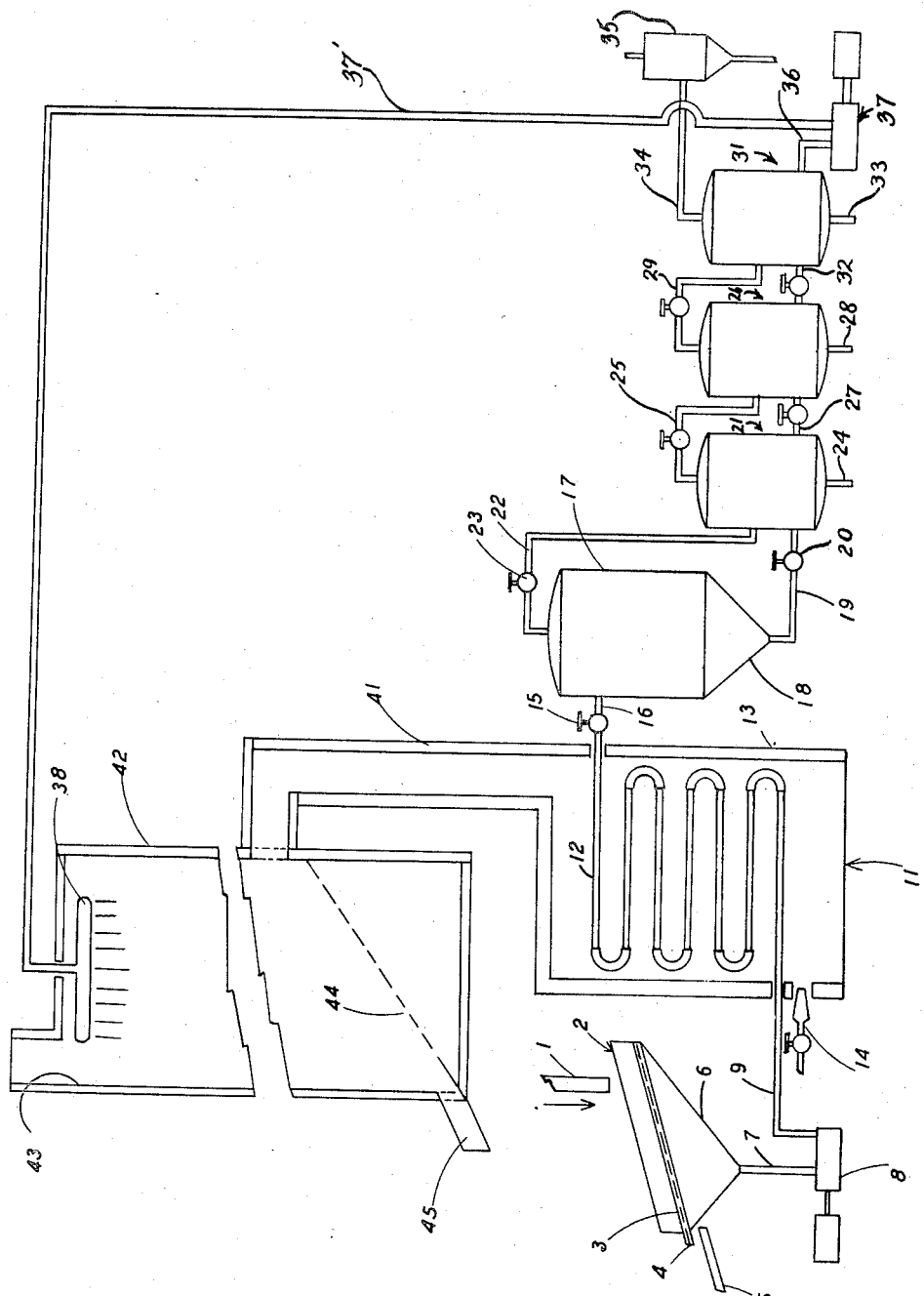
INVENTOR.
ELLIS C. PATTEE
By Louis Burgess
Atty.

Patented Jan. 20, 1948

2,434,672

UNITED STATES PATENT OFFICE 2,434,672

METHOD OF CONCENTRATING DISTILLERY STILL SLOP

Ellis C. Pattee, Cincinnati, Ohio, assignor to National Distillers Products Corporation, a corporation of Virginia Application October 15, 1943, Serial No. 506,317

4 Claims. (Cl. 159—47)

This invention is a new and useful process for concentrating distillery slop. The invention will be understood from the following description read in conjunction with the drawing, the single figure of which is a diagrammatic showing in side elevation with parts in section of apparatus in which the invention may be carried out.

In the manufacture of distilled liquors and of alcohol by the fermentation of cereals, the cereal is first mashed and then fermented and then distilled. The residue remaining in the still is known as distillery slop and contains soluble materials in solution and insoluble materials in suspension. In accordance with my invention the distillery slop from any suitable source is introduced through pipe 1 to screen 2. The screen surface 3 of screen 2 may range from 20 to 100 mesh (Tyler specifications) and is preferably of about 60 mesh. Preferably the screen is of the oscillating or shaking type embodying means for moving the material retained on top of the screen progressively forward so that this material is discharged continuously from the lower end 4 of the screen surface and diverted from the system by means of chute 5. The material passing through the screen includes all the soluble solids and includes also the finer or smaller insoluble solids. This material flows downwardly within the trough 6 into pipe 7. The larger insoluble solids in chute 5 may, if desired, be pressed and the expressed liquor combined with the liquid in pipe 7. The liquid in pipe 7 is moved continuously by means of pump 8 through pipe 9 into the pipe still 11. The pipe still 11 includes the continuous tubular heater 12 mounted in the refractory setting 13 and heated by any suitable means, such as burner 14. Sufficient heat is introduced into the liquid in its passage through heater 12 to raise it to the boiling point and in addition to vaporize a part of the water content therein. The amount of water so vaporized may range from 10 to 40% of the entire water content and preferably is about 25% of the entire water content when three subsequent evaporative effects are employed. If desired, some pressure in excess of atmospheric may be maintained on the material in heater 12 by means of the pressure reduction valve 15. The material so heated is then discharged through pipe 16 into the drum 17 in which separation between the liquor and vapor takes place. The liquid portion accumulates in the cone bottom 18 of drum 17 passing off continuously through pipe 19 controlled by valve 20 into the first unit 21 of a battery of evaporators. The steam is conducted away from the drum 17 through pipe 22, controlled by valve 23, and so introduced into the unit 21, in which it passes in indirect heat exchanging relationship to the liquid introduced through pipe 19. All or part of the steam is condensed in unit 21, the condensate being withdrawn through the pipe 24. Evaporation of the material introduced through pipe 19 takes place in the unit 21, the steam so produced passing off through pipe 25 into the next succeeding evaporator unit 26. The partly concentrated distillery slop passes out of unit 21 through pipe 27 into the unit 26. In this unit the steam from pipe 25 is passed in indirect heat exchanging relationship to the partly concentrated distillery slop so introduced, with the result that all or part of the steam is condensed in this unit, the condensate passing off through the pipe 28. Further evaporation of the water content of the distillery slop occurs in unit 26, the steam so produced passing off through pipe 29 into the next succeeding unit 31. The more nearly concentrated distillery slop passes out of unit 26 through pipe 32 into unit 31. In this unit the steam from pipe 29 passes in indirect heat exchanging relationship to the distillery slop so introduced, with the result that all or part of the steam is condensed, the condensate passing out of the unit through pipe 33. In consequence of this evaporation of the water content of the distillery slop so introduced occurs, the steam so produced passing off through pipe 34 into the barometric condenser 35 by which it is condensed and removed.

It will, of course, be understood that the lowest absolute pressure is maintained on the slop in unit 31, that a slightly higher absolute pressure is maintained on the slop in unit 26, that a still higher absolute pressure is maintained on the slop in unit 21, and that a still higher absolute pressure is maintained on the slop in the drum 17, to the end that the necessary temperature differential for efficient evaporation may exist in each such receptacle.

The concentrated distillery slop passes out of unit 31 through pipe 36 into pump 37. At this stage the moisture content will range between 20 and 40% of the whole, and is preferably approximately 30%. This material is pumped continuously through pipe 37' into the distributor 38.

The products of combustion produced by burner 14 after passing in indirect heat exchanging relationship through the material passing through heater 12 move out of refractory setting 13 through the stack 41 by which they are discharged into the lower part of the spray drying tower 42. These products of combustion move upwardly within the tower 42, passing therein in direct heat exchanging relationship to the concentrated distillery slop introduced into the upper part of the tower in finely divided form by the distributor 38. After so passing the products of combustion move out of the system through the stack 43.

In moving downwardly within the tower 42, the distillery slop is converted into finely divided solid form, in which the moisture content may range between 2 and 12% of the whole and is preferably approximately 8%. This material is continuously collected and withdrawn by means of the sloping bottom 44 and the chute 45.

The product so obtained is firm and chemically stable. It is high in proteins, especially the water soluble proteins, and in vitamin content and is a valuable feed stock.

The foregoing description is for purposes of illustration and not of limitation and it is therefore my intention that the invention be limited only by the following claims or their equivalent wherein I have endeavored to claim broadly all inherent novelty.

I claim:

1. Method of concentrating distillery still slop which comprises screening the same thereby removing coarse suspended solids therefrom and thereafter forcing such slop as a continuous stream through a tubular zone in which it is indirectly heated to a temperature above 100° C., and vaporizing not in excess of 10–40% of the water content of said slop in said zone at a temperature in excess of 100° C., discharging the stream so heated into a separating zone and conducting the steam so withdrawn into indirect heat exchanging relationship to the concentrated slop so withdrawn while maintaining a pressure on said slop below that obtaining in said separating zone.

2. Method of concentrating distillery still slop which comprises screening the same thereby removing coarse suspended solids therefrom and thereafter forcing such slop as a continuous stream through a tubular zone in which it is indirectly heated to a temperature above 100° C. by passing it in said tubular zone in indirect heat exchanging relationship with gaseous products of combustion, and vaporizing not in excess of 10–40% of the water content of said slop in said zone at a temperature in excess of 100° C. thereafter conducting away the said gaseous products of combustion, discharging the stream so heated into a separating zone, continuously removing steam and concentrated slops as independent streams from said separating zone, conducting the steam so withdrawn into indirect heat exchanging relationship to the concentrated slop so withdrawn while maintaining a pressure on said slop below that obtaining in said separating zone thereby producing a syrup and conducting said syrup into direct contact with the said gaseous products of combustion thereby producing dried concentrated slop.

3. Method of concentrating distillery still slop which comprises screening the same thereby removing coarse suspended solids therefrom and thereafter forcing such slop as a continuous stream through a tubular zone in which it is indirectly heated to a temperature above 100° C. by passing it in said tubular zone in indirect heat exchanging relationship with gaseous products of combustion, and vaporizing not in excess of 10–40% of the water content of said slop in said zone at a temperature in excess of 100° C. thereafter conducting away the said gaseous products of combustion, discharging the stream so heated into a separating zone, continuously removing steam and concentrated slop as independent streams from said separating zone, conducting the steam so withdrawn into indirect heat exchanging relationship to the concentrated slop so withdrawn while maintaining a pressure on said slop below that obtaining in said separating zone thereby producing a syrup, subdividing the said syrup and passing the subdivided syrup in direct contact with the said gaseous products of combustion thereby producing dried concentrated distillery slop.

4. In the concentrating of distillery still slop the improvement which comprises screening said slop, thereby removing coarse suspended solids therefrom, thereafter forcing such slop as a continuous stream through a tubular zone, indirectly heating said slop contained in said tubular zone with gaseous products of combustion and vaporizing not in excess of substantially 10–40% of the water content of said slop in said zone at a temperature in excess of 100° C., in order to avoid decomposition of the slop discharging the partly vaporized stream of slop so heated into a separating zone, continuously removing concentrated slop as an independent stream from said separating zone, and continuously removing steam as an independent stream from said separating zone to thereby create a readily available source of indirect heat.

ELLIS C. PATTEE.

REFERENCES CITED

The following references are of record in the file of this patent:

UNITED STATES PATENTS

| Number | Name | Date |
|---|---|---|
| 2,225,428 | Christensen | Dec. 17, 1940 |
| 2,037,006 | Clayton | Apr. 14, 1936 |
| 1,016,160 | Kestner | Jan. 30, 1912 |
| 2,193,786 | Thurman | Mar. 12, 1940 |
| 2,263,608 | Brown | Nov. 25, 1941 |
| 1,033,558 | Dunn | July 23, 1912 |